(12) United States Patent
Sakamoto et al.

(10) Patent No.: US 6,480,245 B1
(45) Date of Patent: Nov. 12, 2002

(54) LCD IN WHICH LAMP REFLECTOR IS GROUNDED TO PANEL HOUSING VIA SCREW, PINCH FASTENING, OR SNAP PRESSING MEANS

(75) Inventors: Takuya Sakamoto, Kumamoto (JP); Hiroshige Hayasaki, Kumamoto (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/700,660

(22) PCT Filed: Mar. 23, 2000

(86) PCT No.: PCT/JP00/01758

§ 371 (c)(1),
(2), (4) Date: Nov. 17, 2000

(87) PCT Pub. No.: WO00/58778

PCT Pub. Date: Oct. 5, 2000

(30) Foreign Application Priority Data

Mar. 26, 1999 (JP) ............................................. 11-084872

(51) Int. Cl.$^7$ ............................................. G02F 1/1333
(52) U.S. Cl. ........................................ 349/59; 349/58
(58) Field of Search ............................... 349/58, 59, 60, 349/65, 67

(56) References Cited

U.S. PATENT DOCUMENTS 5,654,779 A * 8/1997 Nakayama et al. ........... 349/58
5,666,172 A * 9/1997 Ida et al. ....................... 349/58
6,008,870 A * 12/1999 Yun ............................ 349/58

FOREIGN PATENT DOCUMENTS

| JP | 62-49298 | 3/1987 |
| JP | 1-59223 | 4/1989 |
| JP | 2-86053 | 7/1990 |
| JP | 3-127388 | 12/1991 |
| JP | 11-311775 | 11/1999 |
| JP | 2000-148028 | 5/2000 |

* cited by examiner

*Primary Examiner*—Toan Ton
*Assistant Examiner*—Andrew Schechter
(74) *Attorney, Agent, or Firm*—Oblon, Spivak, McClelland, Maier & Neustadt, P.C.

(57) ABSTRACT

A liquid crystal display device includes: a transmission-type liquid crystal panel; a sheet-like light source device for radiating light to a back surface of the liquid crystal panel, the sheet-like light source device including a lamp, a conducting lamp reflector, and a light-conducting plate; a circuit board connected to the liquid crystal panel for supplying a signal necessary for driving the liquid crystal panel; and a mechanism part for housing and holding all three of the liquid crystal panel, the sheet-like light source device, and the circuit board. The mechanism part includes at least one metal part, and the at least one metal part is fixedly attached to the lamp reflector via any one of a screw fastening member, a pinch fastening member, or a snap fastening member. The liquid crystal display device is capable of reducing display deficiencies due to electric noise and is also capable of obtaining clearer images.

13 Claims, 10 Drawing Sheets

FIG. 10
PRIOR ART

LCD IN WHICH LAMP REFLECTOR IS GROUNDED TO PANEL HOUSING VIA SCREW, PINCH FASTENING, OR SNAP PRESSING MEANS

BACKGROUND OF THE INVENTION

1. Field of the Invention

The present invention relates to a liquid crystal display device and more particularly, to a liquid crystal display device capable of reducing display deficiencies due to electric noise (noise) and of obtaining clearer images.

2. Discussion of Background

Figure 10:
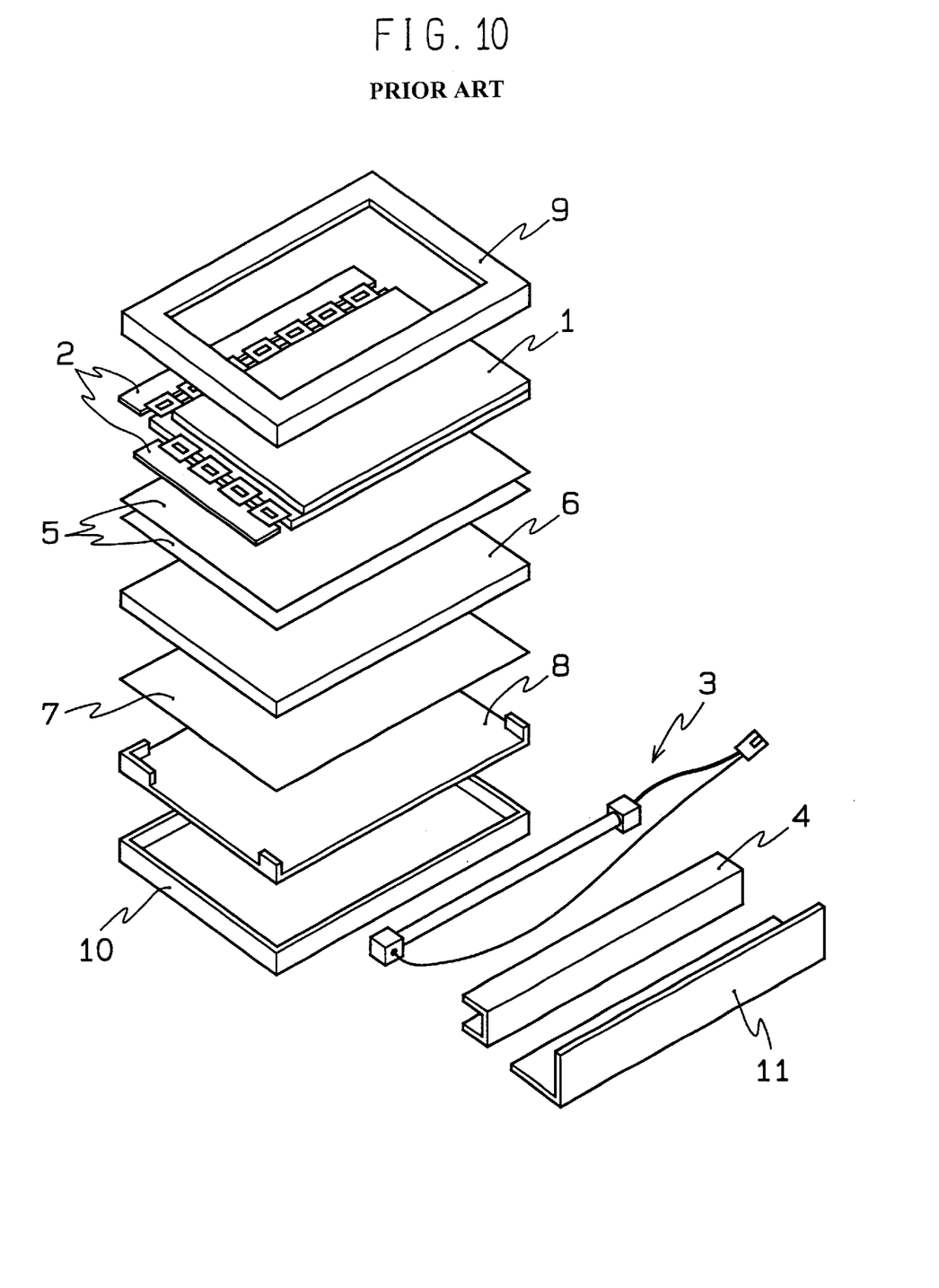
FIG. 10 is an exploded perspective view showing an example of a conventional liquid crystal display device.

A conventional liquid crystal display device is known to comprise, as shown in FIG. 10, a liquid crystal panel 1 having a printed board for a liquid crystal driving circuit 2, a lamp 3, a lamp reflector 4, a lamp cover (rear reinforcement) 11, a plurality of optical sheets 5, a light-conducting plate 6, a reflecting sheet 7, a mechanism part including a resinous frame 8, a rear frame 10 for supporting and fixing the lamp cover 11 and the reflecting sheet 7, and a front frame 9 for fixing these.

Accompanying demands for small-sized frames, display deficiencies due to electric noise are generally considered to be problematic in such a conventional liquid crystal display device provided with a conductive lamp reflector, and in order to avoid such deficiencies, it is necessary to connect the lamp reflector to GND (to ground the same). A general method for grounding the lamp reflector is a method wherein the lamp reflector is made to electrically contact ground or GND through the lamp cover 11, rear frame 10, or front frame 9, which are frame bodies of metal.

Various other methods include: a method in which, at the time of fixing the entire liquid crystal display device through calking of the front frame which is a metallic frame body, grounding is performed by making a calking piece simultaneously contact the lamp reflector; a method in which grounding is performed by providing conductivity between the lamp reflector and the front frame, which is a metallic frame body, by means of an electric conductive tape, such as a copper tape; a method in which grounding is performed by making a protrusion or an extension, formed on the metallic frame body, contact the lamp reflector; or a method in which grounding is performed by providing conductivity between the lamp reflector and the metallic frame body by means of soldering.

However, in a conventional liquid crystal display device employing a grounding method wherein contact is performed using a calking piece or protrusion/extension, a drawback is presented that grounding cannot be reliably performed since contact deficiencies might occur between the metallic frame body and the lamp reflector when shock is applied to the liquid crystal display device. Further, in a liquid crystal display device employing a method using an electric conductive tape or soldering, a drawback is presented that assembly of the liquid crystal display device becomes more costly.

SUMMARY OF THE INVENTION

In view of the above-stated facts, it is an object of the present invention to provide a liquid crystal display device capable of reducing display deficiencies due to electric noise and capable of obtaining clearer images.

The liquid crystal display device, according to a first aspect of the present invention, comprises: a transmission-type liquid crystal panel; a sheet-like light source device for radiating light to a back surface of the liquid crystal panel, the sheet-like source device including a lamp, a conductive lamp reflector, and a light-conducting plate; a circuit board connected to the liquid crystal panel for supplying a signal necessary for driving the liquid crystal panel; and a mechanism part for housing a holding all three of the liquid crystal panel, the sheet-like light source device, and the circuit board, wherein the mechanism part includes at least one metal part, and wherein the at least one metal part is fixedly attached to the lamp reflector via screw fastening means.

It is preferable that the metal part to be connected to the lamp reflector forms at least a part of a display surface side and a part of a side of the liquid crystal display device.

It is preferable that the metal part to be connected to the lamp reflector forms at least a part of a back surface of the liquid crystal display device.

It is preferable that the metal part to be connected to the lamp reflector forms at least a part of a back surface and a part of a side of the liquid crystal display device.

It is preferable that the metal part to be connected to the lamp reflector is so arranged to cover the lamp reflector.

It is preferable that the screw fastening means is composed of a screw and a female screw working, or a screw and a calking nut.

It is preferable that, at a fixation portion through the screw fastening means, the metal part is fixedly attached to the lamp reflector together with at least one other component.

The liquid crystal display device, according to a second aspect of the present invention, comprises: a transmission-type liquid crystal panel; a sheet-like light source device for radiating light to a back surface of the liquid crystal panel, the sheet-like source device including a lamp, a conductive lamp reflector, and a light-conducting plate; a circuit board connected to the liquid crystal panel for supplying a signal necessary for driving the liquid crystal panel; and a mechanism part for housing and holding all three of the liquid crystal panel, the sheet-like light source device, and the circuit board, wherein the mechanism part includes at least one metal part, and wherein the at least one metal part is fixedly attached to the lamp reflector via a pinch fastening means obtained by plastic working.

It is preferable that the pinch fastening means is obtained by inserting either one of a protruding or an extending piece or a protruding or an extending cylindrical body protruding or extending from either the lamp reflector or the at least one metal part into a hole through either one of the lamp reflector or the at least one metal part, respectively and then, crushing either one of the protruding or extending piece or the protruding or extending cylindrical body.

It is preferable that, at a fixation portion through the pinch fastening means obtained by plastic working, the at least one metal part is fixedly attached to the lamp reflector together with at least one other component, such as a lamp cover.

The liquid crystal display device, according to a third aspect of the present invention, comprises: a transmission-type liquid crystal panel; a sheet-like light source device for radiating light to a back surface of the liquid crystal panel, the sheet-like source device including a lamp, a conductive lamp reflector, and a light-conducting plate; a circuit board connected to the liquid crystal panel for supplying a signal necessary for driving the liquid crystal panel; and a mechanism part for housing and holding all three of the liquid crystal panel, the sheet-like light source device, and the circuit board, wherein the mechanism part includes at least one metal part, and wherein the at least one metal part is fixedly attached to the lamp reflector via a snap pressing means for achieving fixed attachment in a freely attachable/detachable manner.

It is preferable that the snap pressing means is a pin member having a head and a shank extending outwardly from the body, wherein the shank includes a slit and wherein the shank extends through a hole in a longitudinal direction.

It is preferable that, at a fixation portion through the snap pressing means, the at least one metal part is fixedly attached to the lamp reflector together with at least one other component, such as a lamp cover.

It is preferable that the snap pressing means is a pin member having a slit which pierces through in a longitudinal direction.

It is preferable that, at a fixation portion through the snap pressing means, the metal part is fixedly attached to the lamp reflector together with at least one other component.

DETAILED DESCRIPTION OF THE PREFERRED EMBODIMENT

Figure 1:
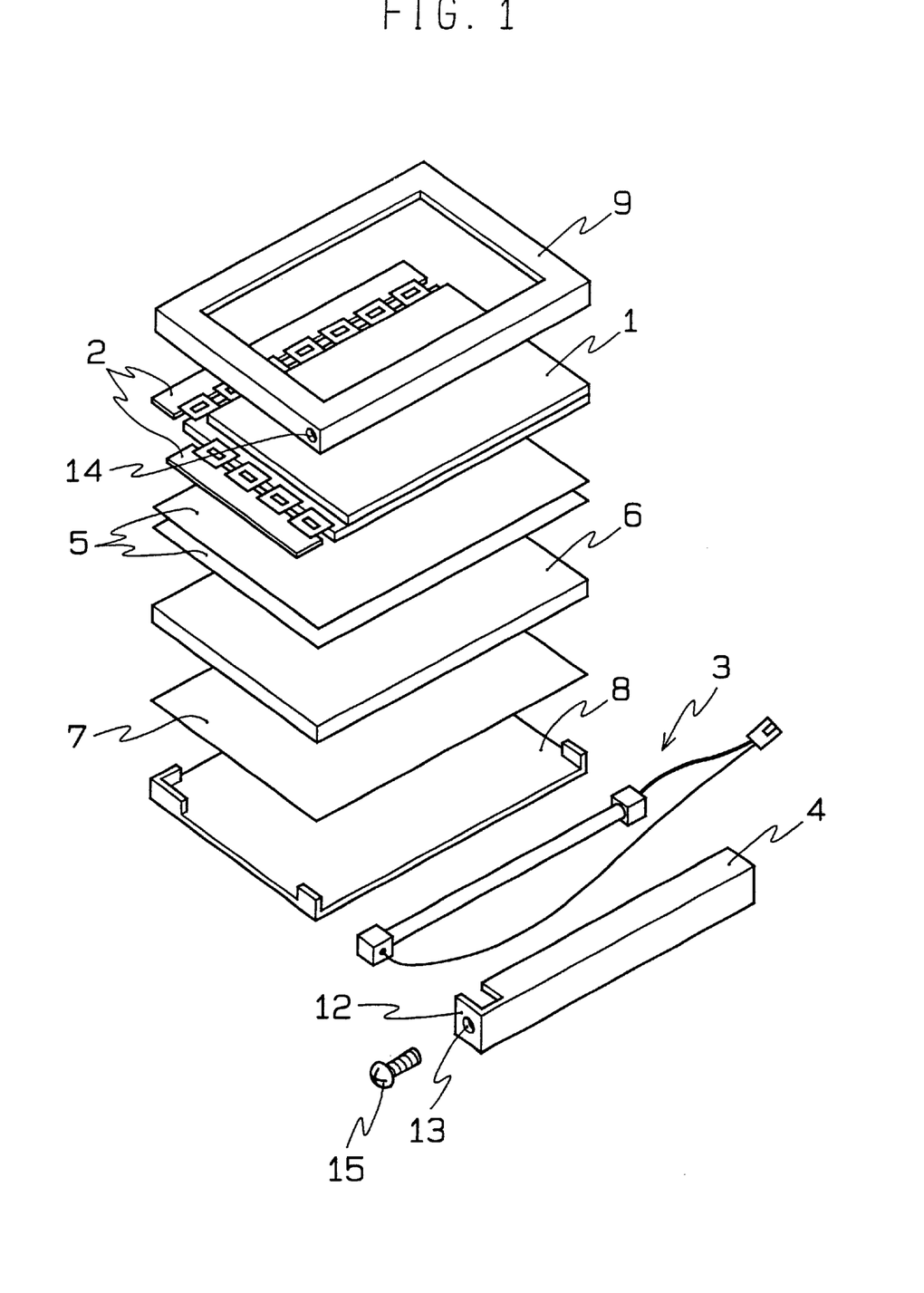
FIG. 1 is an exploded perspective view showing one embodiment of the liquid crystal display device according to the present invention.

FIG. 1 is a first embodiment according to the present invention. The liquid crystal display device according to the present invention comprises a liquid crystal panel 1, a circuit board 2 connected to the panel through FPC on which a driver IC is mounted, a sheet-like light source device including a lamp 3, a lamp reflector 4, at least one optical sheet 5, a light-conducting plate 6 and a reflecting sheet 7, and a mechanism part including a resinous frame 8 and a front frame 9. The front frame 9 is a metal part, and the lamp reflector 4 and the front frame 9 on the display surface side of the liquid crystal display device are fixedly screwed (attached) in a freely attachable/detachable manner by means of a screw fastening means.

Figure 2:
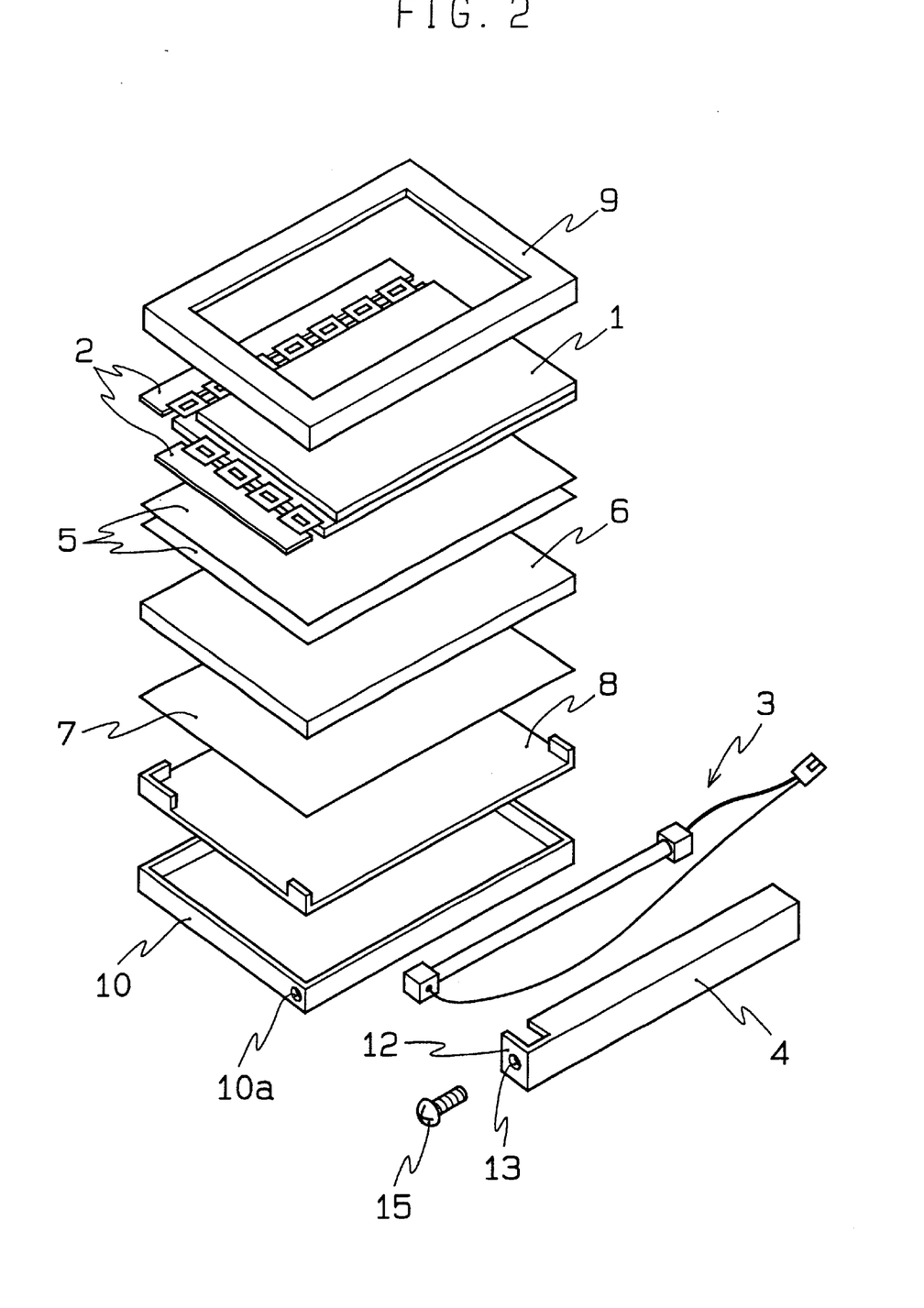
FIG. 2 is an exploded perspective view showing second embodiment of the liquid crystal display device according to the present invention.

FIG. 2 is a second embodiment according to the present invention. The liquid crystal display device according to the present invention comprises a liquid crystal panel 1, a circuit board 2 connected to the panel through FPC on which a driver IC is mounted, a sheet-like light source device including a lamp 3, a lamp reflector 4, at least one optical sheet 5, a light-conducting plate 6 and a reflecting sheet 7, and a mechanism part including a resinous frame 8, a front frame 9 and a rear frame 10. The rear frame 10 is a metal part, and the lamp reflector 4 and the rear frame 10 on the rear side of the liquid crystal display device are fixedly attached in a freely attachable/detachable manner by means of a screw fastening means.

Figure 3:
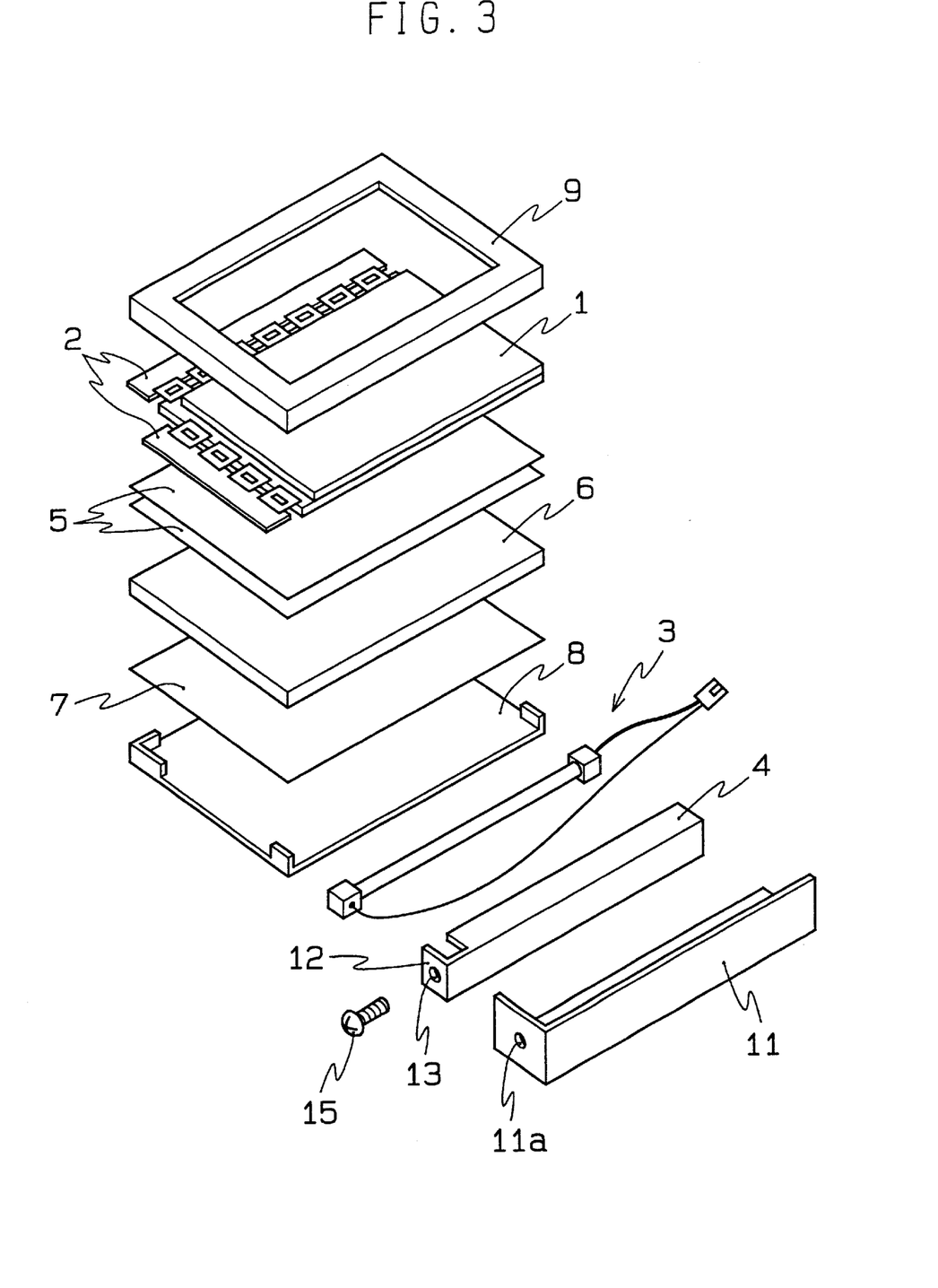
FIG. 3 is an exploded perspective view showing third embodiment of the liquid crystal display device according to the present invention.

FIG. 3 is a third embodiment according to the present invention. The liquid crystal display device according to the present invention comprises a liquid crystal panel 1, a circuit board 2 connected to the panel through FPC on which a driver IC is mounted, a sheet-like light source device including a lamp 3, a lamp reflector 4, at least one optical sheet 5, a light-conducting plate 6 and a reflecting sheet 7, and a mechanism part including a resinous frame 8, a front frame 9 and a lamp cover 11 for a rear reinforcement. The lamp cover 11 is a metal part, and the lamp reflector 4 and the lamp cover 11 which is so disposed as to cover the lamp reflector are fixedly attached in a freely attachable/detachable manner by means of a screw fastening means with each other.

Figure 4A:
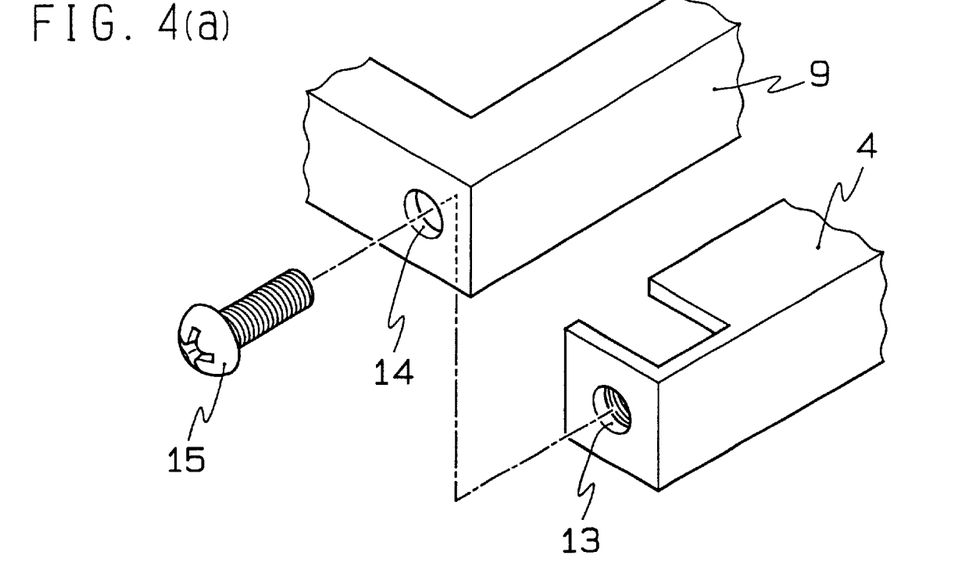
FIGS. 4(a) and 4(b) are an enlarged view of a connecting portion.
Figure 4B:
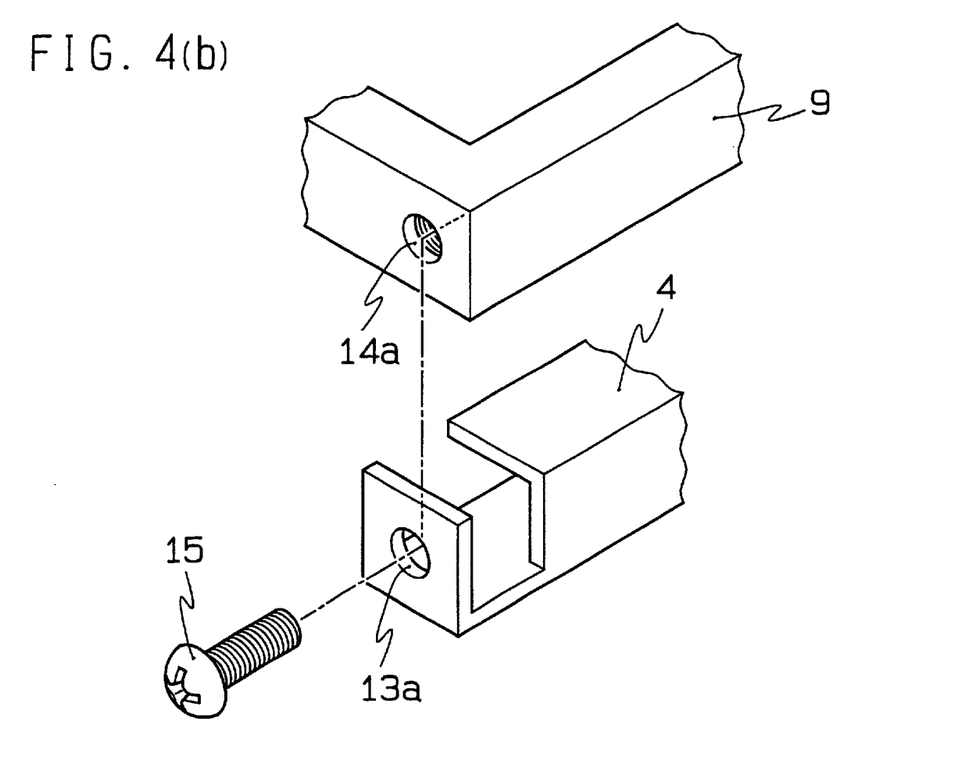

As shown in FIG. 4(a), a screw hole 13, to which a female screw working is performed through burring or similar, is formed on a lateral surface 12 of the lamp reflector 4 to serve as a connecting portion. The lamp reflector 4 is screw fastened and fixed by means of a screw 15 which is inserted through a hole 14 formed on a lateral portion of the metallic front frame 9. In the present embodiment, though a screw working is made on the lamp reflector 4, there might be employed a method in which a screw hole 14a is formed on the front frame 9 to perform screw fastening by means of a screw 15 which is inserted through a hole 13a formed on the lamp reflector 4 as shown in FIG. 4(b). Further, as long as the lamp reflector is mechanically and electrically connected to the front frame by means of a screw fastening as stated above, the position and number of connections are not limited.

It should be noted that while the lamp reflector and the metallic front frame are grounded by means of screw fastening, the present invention is not limited to this arrangement, but there might be also employed an arrangement wherein, as shown in FIG. 2, the metallic rear frame 10 and the lamp reflector 4, or as shown in FIG. 3, the metallic lamp cover 11 and the lamp reflector 4, are grounded by means of the screw fastening, instead of using the front frame, which is a metallic frame body. In those cases, it should be noted that holes 10a, 11a are formed through surfaces of the rear frame 10 and the lamp cover 11.

Figure 5A:
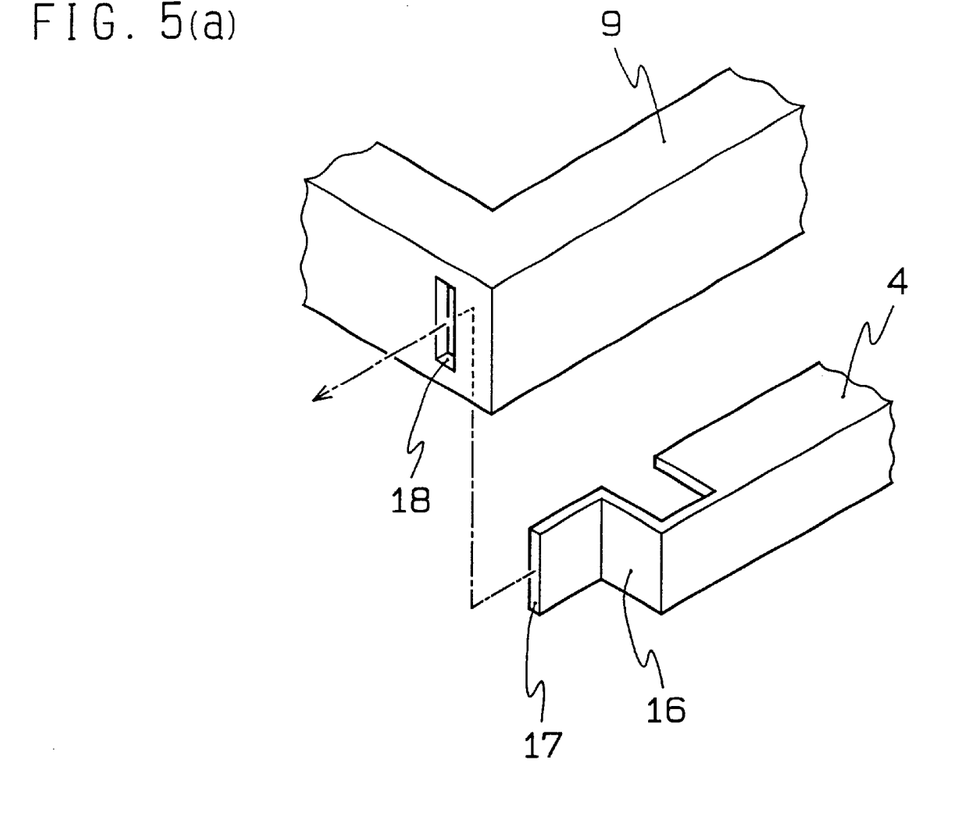
FIGS. 5(a) and 5(b) are a perspective view showing an embodiment of a pinch fastening means.
Figure 5B:
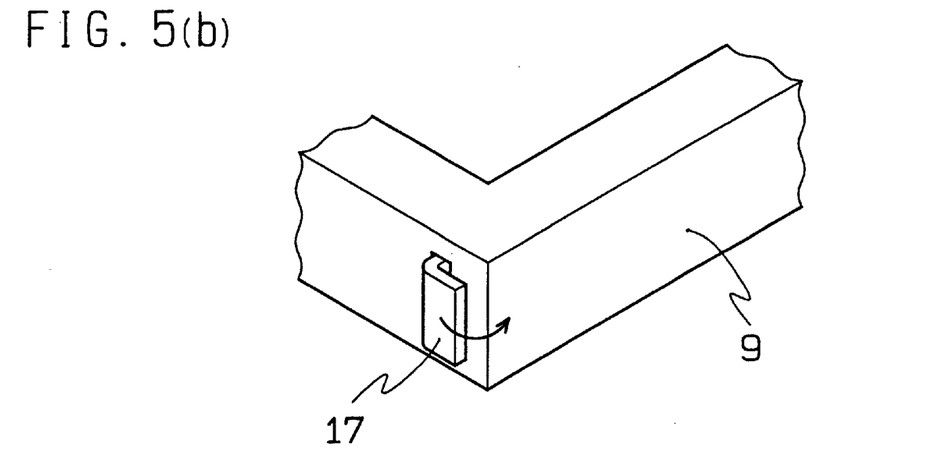
Figure 6A:
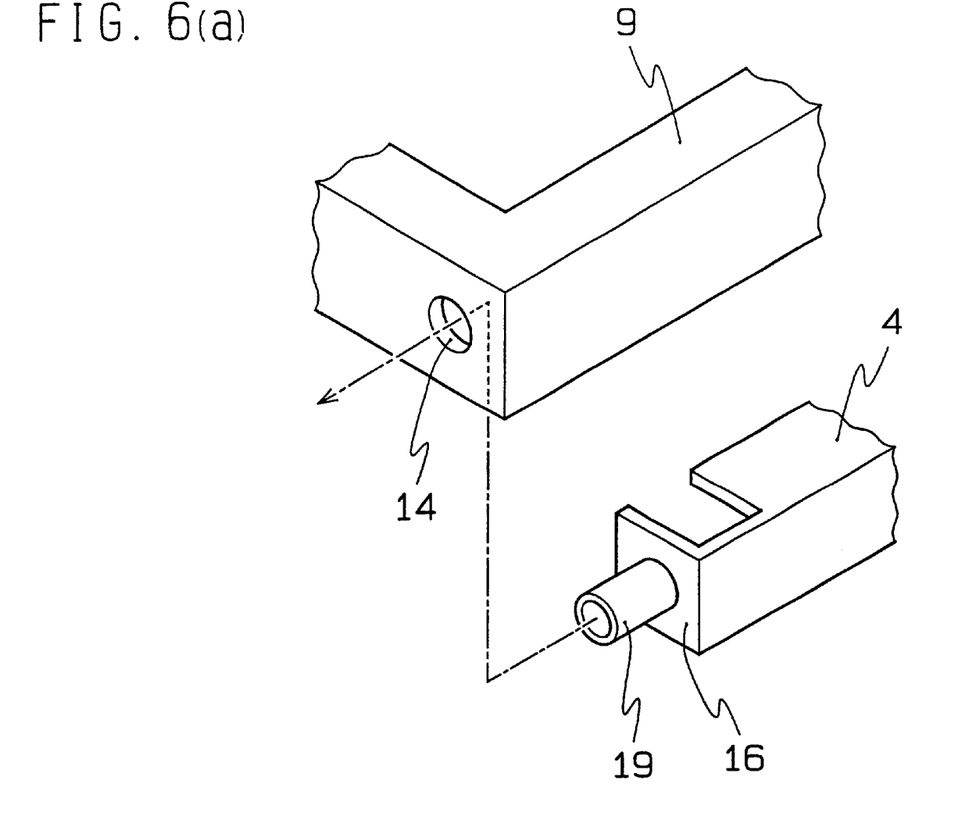
FIGS. 6(a) and 6(b) are a perspective view showing another embodiment of the pinch fastening means.
Figure 6B:
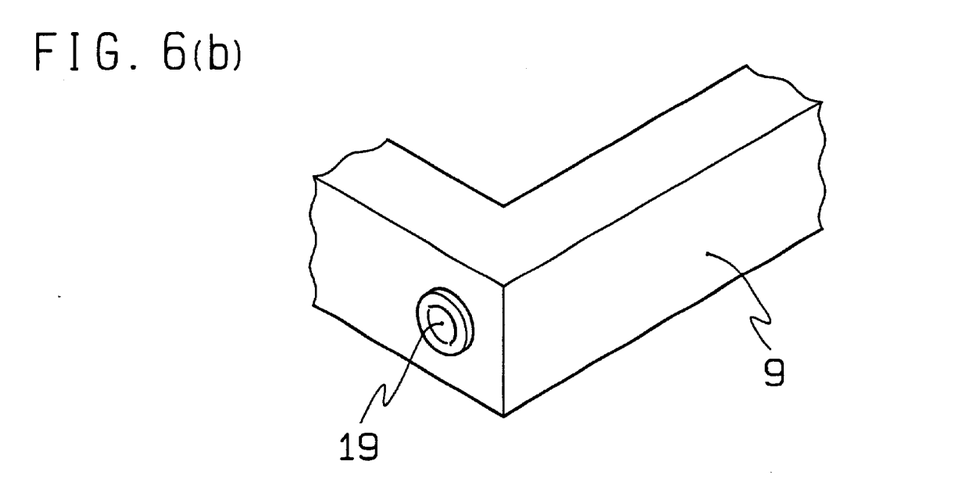
Figure 7A:
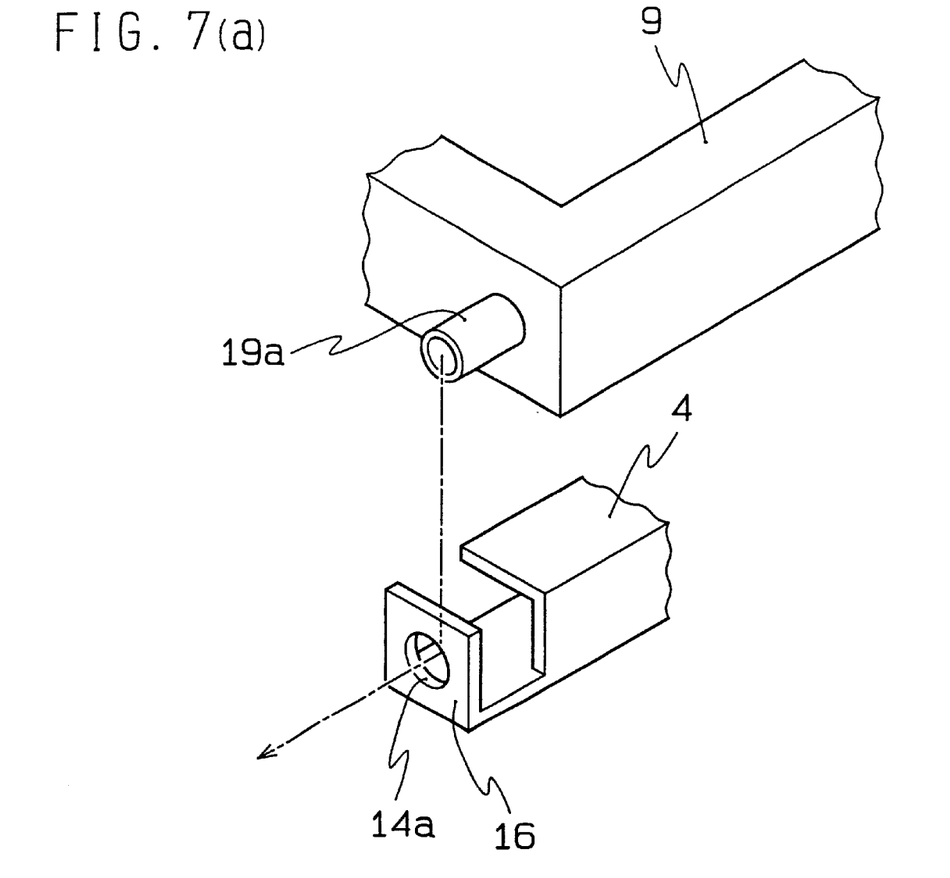
FIGS. 7(a) and 7(b) are a perspective view showing still another embodiment of the pinch fastening means.
Figure 7B:
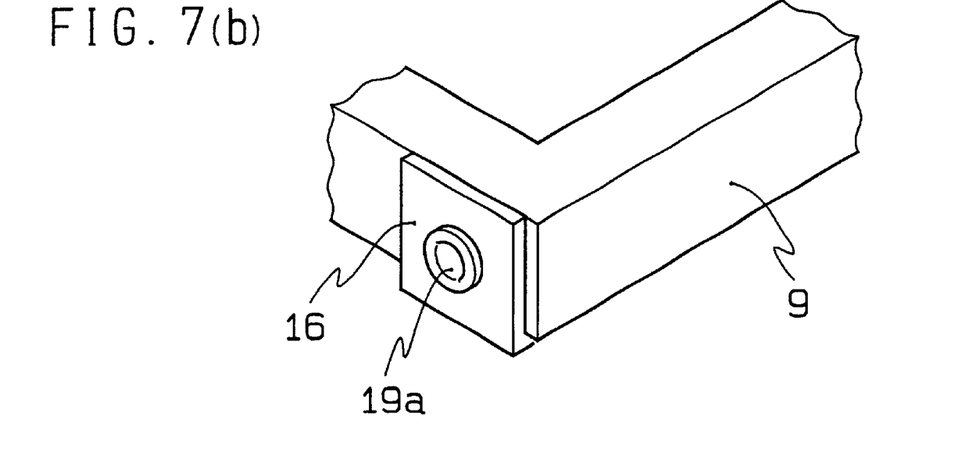

Further, although the front frame and the lamp reflector are fixedly attached by means of a screw fastening means, it is possible to employ, instead of the screw fastening means, a pinch fastening means, as shown in FIG. 5(a), which includes a protruding or an extending piece 17 formed at a protruding or an extending portion 16 of the lamp reflector 4 and a rectangular hole 18 formed at the lateral portion of the front frame 9. In the case of employing such a pinch fastening means, the protruding or extending piece 17 is inserted into the rectangular hole 18, whereupon a tip end portion of the protruding or extending piece 17 is bent, through plastic working, to be pinched and fixed at the front frame 9, as shown in FIG. 5(b). With this arrangement, the lamp reflector 4 might contact the front frame 9 for providing conductivity. Alternatively, there might be employed, as shown in FIG. 6(a), a pinch fastening means including a protruding or an extending cylindrical body 19 provided at a protruding or an extending portion 16 of the lamp reflector 4 and a circular hole 14 formed at the lateral portion of the front frame 9 wherein, as shown in FIG. 6(b), the protruding or extending cylindrical body 19 is inserted into the circular hole 14, whereupon a front tip outer peripheral edge portion of the protruding or extending cylindrical body 19 is crushed outwardly through plastic working, such that the lamp reflector 4 is pinched and held at the front frame 9. With this arrangement, the lamp reflector 4 might contact the front frame 9 for providing conductivity. Although there are formed the protruding or extending cylindrical body of the lamp reflector and the circular hole of the lateral portion of the front frame in the present embodiment, there might be employed a method, as shown in FIGS. 7(a)–7(b), wherein a protruding or an extending cylindrical body 19a is formed at the protruding or extending portion 16 of the lamp reflector 4, and the protruding or extending cylindrical body 19a is inserted into a hole of the protruding or extending portion 16, whereupon a front tip outer peripheral edge portion of the protruding or extending cylindrical body 19a is crushed outwardly through plastic working to be pinched.

It should be noted that while the lamp reflector and the metallic front frame are grounded by means of pinch fastening, the present invention is not limited to this arrangement but there might be also employed an arrangement wherein the metallic rear frame and the lamp reflector, or the metallic lamp cover and the lamp reflector are grounded by means of pinch fastening instead of using the front frame which is a metallic frame body.

Figure 8:
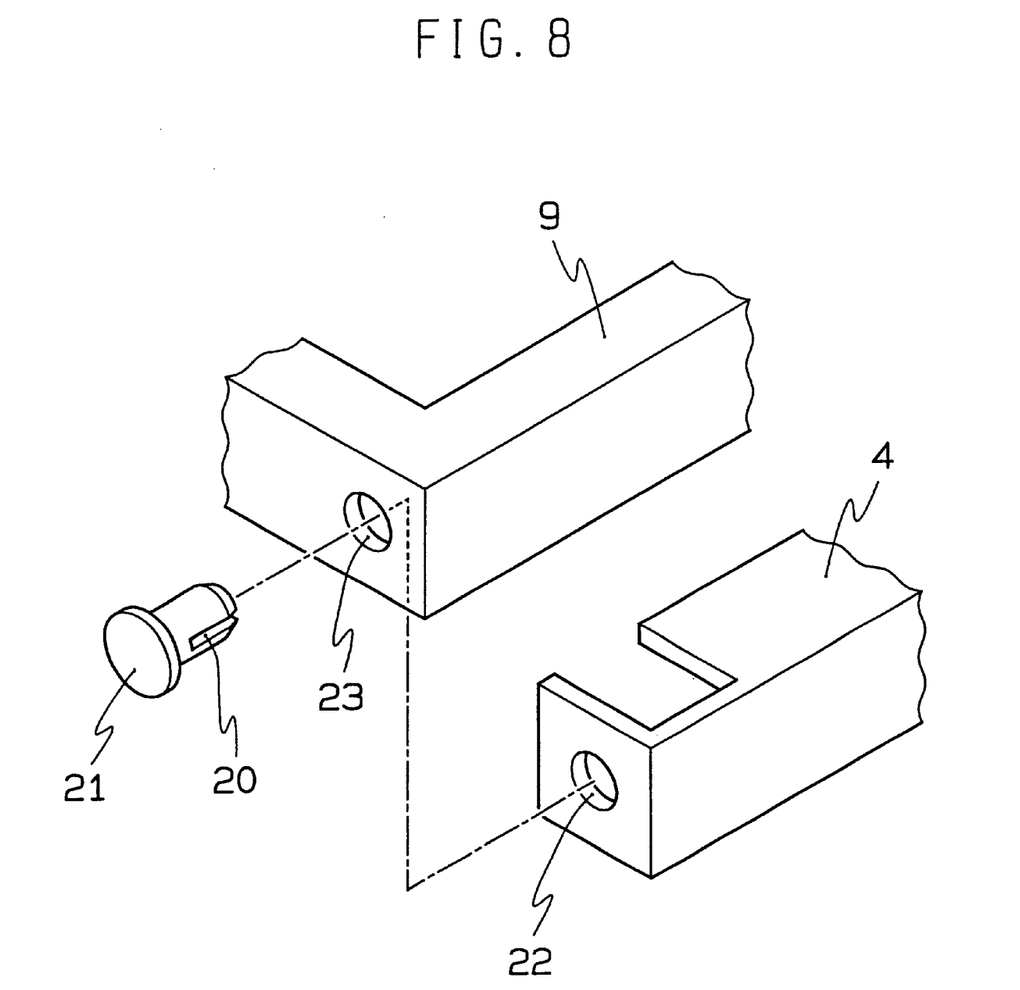
FIG. 8 is a cross view showing an embodiment of a snap pressing means.

It is further possible in the present invention to utilize, instead of the screw fastening means, an arrangement wherein a pin member 21, which is an elastically deformable snap pressing means, having a head and a shank with a slit 20 therein, the shank extends through in a longitudinal direction so as to be press-inserted into holes 22, 23 formed at the lamp reflector 4 and a metallic frame, for instance, the front frame 9, as shown in FIG. 8. Then, upon elastic deformation of the pin member 21, the lamp reflector 4 and the front frame 9 might be fixedly attached.

It should be noted that while the lamp reflector and the metallic front frame are grounded by means of pin member, the present invention is not limited to this arrangement but there might be also employed an arrangement wherein the metallic rear frame and the lamp reflector, or the metallic lamp cover and the lamp reflector are grounded by means of pin member instead of using the front frame which is a metallic frame body.

Figure 9:
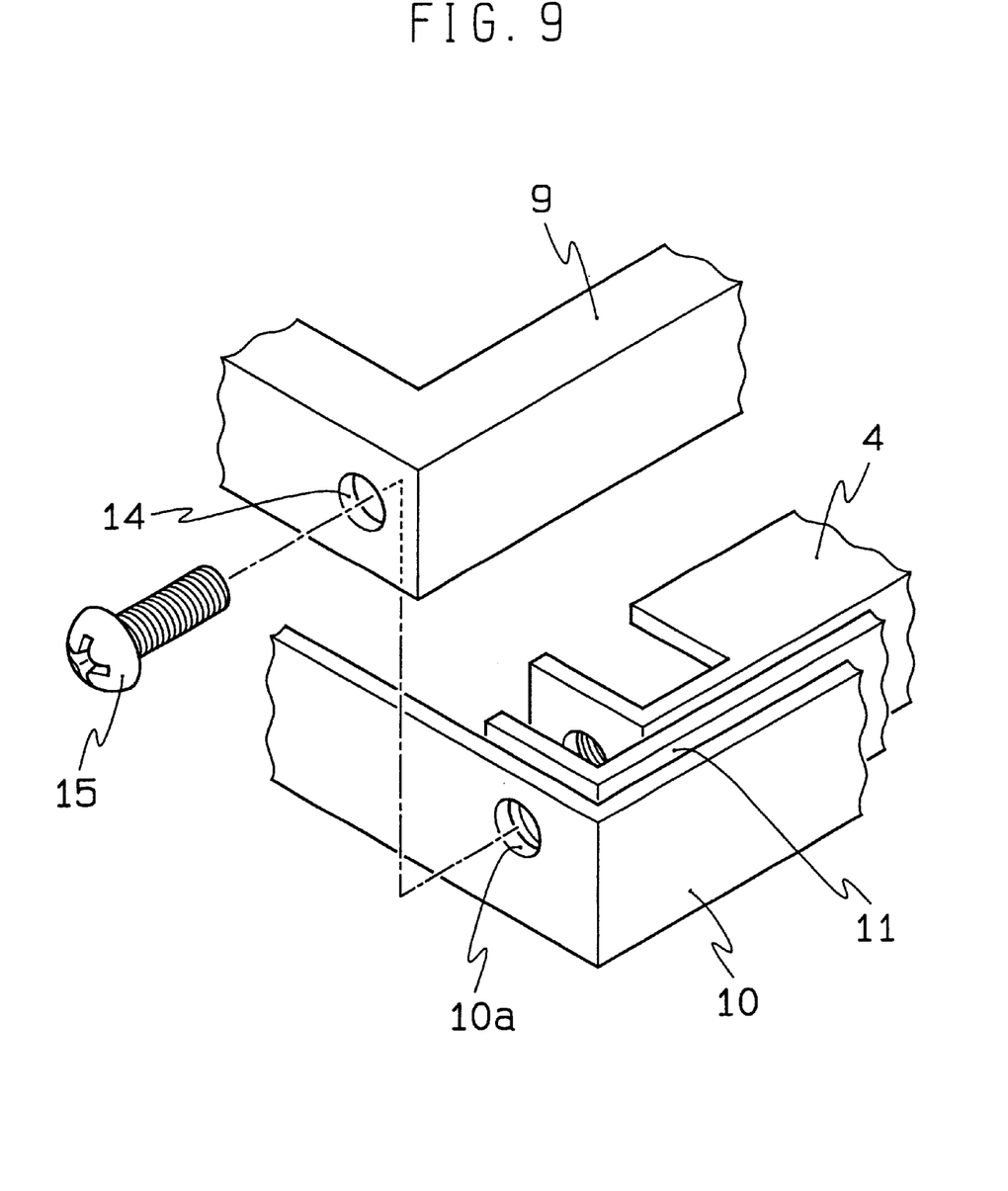
FIG. 9 is a perspective view explaining another connecting state of a connecting portion in the present invention.

Further, in the case of connecting the lamp reflector 4 and the other metallic parts, as shown in FIG. 9, not only two parts, but also not less than three part, for instance, the lamp reflector 4, the front frame 9, the rear frame 10, and/or the lamp cover 11, might be contemporarily attached.

INDUSTRIAL APPLICABILITY

According to the present invention, the lamp reflector which is electrically connected to a metal part such as a front frame, rear frame or lamp cover through screw fastening means, plastic working or snap pressing means is finally connected to GND of a circuit board through these metallic parts, thereby it is enable to achieve a liquid crystal display device which is resistant to electric noise.

What is claimed is:

1. A liquid crystal display device comprising:
   a transmission-type liquid crystal panel;
   a sheet-like light source device for radiating light to a back surface of said transmission-type liquid crystal panel, said sheet-like light source device including a lamp, a conductive lamp reflector, and a light-conducting plate;
   a circuit board connected to said transmission-type liquid crystal panel for supplying a signal necessary for driving said transmission-type liquid crystal panel;
   a mechanism part for housing and holding all three of said transmission-type liquid crystal panel, said sheet-like light source device, and said circuit board, wherein said mechanism part includes at least one metal part, and wherein said at least one metal part is fixedly attached to said lamp reflector via a fastening means, said at least one metal part and said lamp reflector each being in contact with said fastening means, and said fastening means uniting said at least one metal part and said lamp reflector into a single piece.

2. The liquid crystal display device of claim 1, wherein said at least one metal part to be connected to said lamp reflector forms at least a portion of a display surface side and a portion of a side of said transmission-type liquid crystal display device.

3. The liquid crystal display device of claim 1, wherein said at least one metal part to be connected to said lamp reflector forms at least a portion of a back surface of said transmission-type liquid crystal display device.

4. The liquid crystal display device of claim 1, wherein said at least one metal part to be connected to said lamp reflector forms at least a portion of a back surface and a portion of a side of said transmission-type liquid crystal display device.

5. The liquid crystal display device of claim 1, wherein said at least one metal part to be connected to said lamp reflector is so arranged to cover said lamp reflector.

6. The liquid crystal display device of claim 1, wherein said fastening means is a screw fastening means having threads on an outer peripheral surface of a shank of said screw fastening means, said threads on said outer peripheral surface of said shank of said screw fastening means mating with threads in outer peripheral surfaces of a hole in said at least one metal part and a hole in said lamp reflector.

7. The liquid crystal display device of claim 6, wherein, at a fixation portion through said screw fastening means, said at least one metal part is fixedly attached to said lamp reflector and a lamp cover.

8. The liquid crystal display device of claim 6, wherein said screw fastening means is composed of either both a screw and a female screw working or both a screw and a calking nut.

9. The liquid crystal display device of claim 1, wherein said fastening means is a snap pressing means for achieving fixed attachment in a freely attachable/detachable manner, said snap pressing means being a pin member having a slit through a shank of said pin member in a longitudinal direction of said shank so as to form first and second leg members on an end of said pin member, said first and second leg members moving slightly towards and away from each other when said pin is being snap-fitted into holes in said at least one metal part and said lamp reflector.

10. The liquid crystal display device of claim 9, wherein at a fixation portion through said snap pressing means, said at least one metal part is fixedly attached to said lamp reflector and a lamp cover.

11. A liquid crystal display device comprising:

a transmission-type liquid crystal panel;

a sheet-like light source device for radiating light to a back surface of said transmission-type liquid crystal panel, said sheet-like light source device including at least a lamp, a conductive lamp reflector and a light-conducting plate;

a circuit board connected to said transmission-type liquid crystal panel for supplying signal necessary for driving said transmission-type liquid crystal panel;

a mechanism part for housing and holding said transmission-type liquid crystal panel, said sheet-like light source device and said circuit board, wherein said mechanism part includes at least one metal part, and wherein said at least one metal part is fixedly attached to said lamp reflector via a pinch fastening means obtained by plastic working.

12. The liquid crystal display device of claim 11, wherein said pinch fastening means is obtained by first inserting either one of a protruding piece or a protruding cylindrical body protruding from either said lamp reflecting or said at least one metal part into a hole formed at either said at least one metal part or said lamp reflector, respectively and then, crushing either one of said protruding piece or said protruding cylindrical body.

13. The liquid crystal display device of claim 11, wherein, at a fixation portion through said pinch fastening means obtained by the plastic working, said at least one metal part is fixedly attached to said lamp reflector and a lamp cover.

* * * * *